Patented Apr. 27, 1937

2,078,538

UNITED STATES PATENT OFFICE 2,078,538

4,5-ALKYLSUBSTITUTED 2-AMINODIARYL-KETONES AND PROCESS OF PREPARING THEM

Georg Kränzlein and Theodor Meissner, Frankfort-on-the-Main-Höchst, Germany, assignors to General Aniline Works, Inc., New York, N. Y., a corporation of Delaware No Drawing. Application November 15, 1935, Serial No. 50,060. In Germany November 20, 1934

12 Claims. (Cl. 260—64)

The present invention relates to a process of preparing 4,5-alkylsubstituted 2-aminodiarylketones.

We have found that the hitherto unknown 4,5-alkylsubstituted 2-aminodiaryl-ketones, for instance, those of the following general formulae

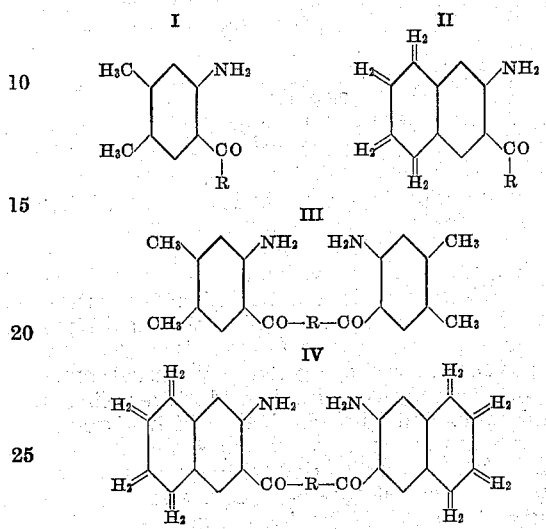

or of the general formula

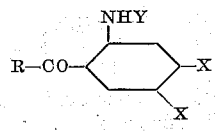

wherein Y represents hydrogen or acetyl, R an aryl group of the benzene and naphthalene series and which compounds contain two identical alkyl groups in positions X or a tetramethylen chain bound at both ends to the benzene nucleus in positions X, may be obtained with a very good yield by causing an acid chloride or acid anhydride of an aromatic carboxylic acid, for instance, mono- or dicarboxyclic acid to react, according to Friedel Crafts reaction with aluminium chloride, or its further improved method, for instance, by means of borofluoride, upon a compound of the general formula

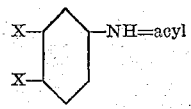

wherein X means alkyl or the two X's jointly represent the tetramethylene radical of the formula

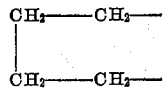

and, if desired, simultaneously or subsequently saponifying the NH-acyl-group of this compound.

The new bases may be used either as such or as intermediates for the manufacture of dyestuffs or as preliminary products for dyestuffs.

The following examples illustrate the invention, but they are not intended to limit it thereto, the parts being by weight unless stated otherwise and the relationship between parts by weight and parts by volume being that which exists between a kilogram and a litre:—

(1) 32 parts of 1-acetamino-3,4-dimethylbenzene (melting at 96–98° C.) are stirred in 250 parts by volume of dry carbon disulfide with 50 parts of benzoyl chloride; while cooling with ice-water, 200 parts of pulverized aluminium chloride are added in portions. Thereupon, the whole is stirred for 2 hours at room temperature and then gently heated on the water-bath until the evolution of acid has decreased. The carbon disulfide is either decanted after a prolonged standing or it is distilled at once, and the residue is then decomposed with ice and hydrochloric acid. The whole is filtered with suction, the solid matter is first washed with hydrochloric acid until the aluminium salts have been removed and then with dilute caustic soda solution in order to eliminate the excess of benzoic acid. The matter is washed neutral and the 2-acetamino-4,5-dimethylbenzophenone thus obtained is crystallized from methanol in the form of colorless prisms which melt at 117° C. It dissolves in concentrated sulfuric acid to a yellow solution.

20 parts of the 2-acetamino-4,5-dimethylbenzophenone thus obtained are boiled under reflux with 200 parts of a mixture of equal parts of concentrated hydrochloric acid and water while stirring, until the saponification is finished which is indicated by complete dissolution after about one hour. The solution is cooled whereby the hydrochloride of the 2-amino-4,5-dimethylbenzophenone crystallizes in the form of colorless needles. The whole is filtered with suction and the hydrochloride is stirred into 20–30 times its weight of water; the free base separates after a short time in the form of yellow prisms, melting at 93° C. The 2-amino-4,5-dimethylbenzophenone is easily soluble in alcohol, benzene and glacial acetic acid and, to a small extent, in hot water. It may well be crystallized from ligroin, thereby its melting point does not change.

(2) 30 parts of acetamino-3,4-dimethylbenzene are stirred into 250 parts by volume of carbone disulfide with 50 parts of ortho-chlorobenzoyl chloride and 200 parts of pulverized aluminium chloride are then added in portions, while cooling with ice-water. The mass is stirred for 1 hour at room temperature and is then gently heated on the water-bath until the evolution of hydrochloric acid has decreased. The reaction product is worked up as described in Example (1); there is obtained the 2-acetamino-4,5-dimethyl-2'-chlorobenzophenone which dissolves in concentrated sulfuric acid to a yellow solution and crystallizes from methanol in coarse colorless prisms, melting at 173° C.

By saponifying the acetylamino-compound by boiling it with hydrochloric acid and introducing the mass, while stirring, into an excess of cold dilute caustic soda solution, the 2-amino-4,5-dimethyl-2'-chlorobenzophenone is obtained in the form of yellow prisms melting at 120° C.

By using meta-chlorobenzoyl chloride, the 2-amino-4,5-dimethyl-3'-chlorobenzophenone is obtained which separates from petroleum ether in the form of yellow little rods melting at 101° C.; the acetyl compound separates from aqueous methanol in the form of coarse colorless prisms, melting at 106° C.

By using para-chlorobenzoyl chloride, the 2-amino-4,5-dimethyl-4'-chlorobenzophenone is obtained, which crystallizes from methanol in the form of light-yellow needles, melting at 155° C.; the acetyl compound crystallizes from methanol in the form of colorless coarse prisms melting at 152° C.

By using 2,4-dichlorobenzoyl chloride, the 2-amino-4,5-dimethyl-2',4'-dichlorobenzophenone is obtained which crystallizes from aqueous methanol in the form of light-yellow needles, melting at 95° C. The acetyl compound crystallizes from methanol in the form of fine colorless needles, melting at 139° C.

By using 2,5-dichlorobenzoyl chloride, the 2-amino-4,5-dimethyl-2',5'-dichlorobenzophenone is obtained, crystallizing from aqueous methanol in the form of light-yellow needles of the melting point 115° C. The acetyl-compound which dissolves in sulfuric acid to a reddish-yellow solution, unlike the above-mentioned substances which dissolve to pure yellow solutions, crystallizes from methanol in the form of coarse colorless prisms which melt at 136° C.

By using meta-nitrobenzoyl chloride the 2-amino-4,5-dimethyl-3'-nitrobenzophenone is obtained which crystallizes from methanol in the form of golden-yellow prisms, melting at 119° C.; the acetyl compound separates from petroleum ether in the form of a light-yellow amorphous powder which melts at 167° C.

By using para-nitrobenzoyl chloride, the 2-amino-4,5-dimethyl-4'-nitrobenzophenone is obtained which crystallizes from methanol in the form of orange coarse prisms, melting at 162° C.; the acetyl compound which melts at 170° C.–172° C. separates from petroleum ether in the form of an amorphous yellow powder.

By using alpha-naphthoic acid chloride, the 2-amino-4,5-dimethyl-2',3'-benzo-benzophenone is obtained which, after recrystallization from aqueous methanol, melts at 113° C.–116° C. The acetyl compound dissolves in concentrated sulfuric acid to a red-brown solution which, on standing, turns red.

By using beta-naphthoic acid chloride the 2-amino-4,5-dimethyl-3',4'-benzo-benzophenone is obtained which crystallizes from aqueous alcohol in the form of a light-yellow powder melting at 102° C.–104° C. The acetyl-compound dissolves in concentrated sulfuric acid to a yellow-brown solution which, on standing, turns brown-red.

(3) 10 parts of terephthaloyl chloride are stirred with 30 parts of acetamino-3,4-dimethylbenzene in 150 parts by volume of carbon disulfide; 150 parts of aluminium chloride are then added in portions. The whole is then worked up as described in the foregoing examples. The 2,2'-diacetamino-4,5,4',5'-tetramethylterephthalophenone is obtained which dissolves in concentrated sulfuric acid to a golden-yellow solution and crystallizes from chlorobenzene in the form of fine rhombohedrons which melt at 290° C.–292° C.

By saponifying this compound with a mixture of equal parts of concentrated hydrochloric acid and water the 2,2'-diamino-4,5,4',5'-tetramethyl-terephthalophenone is obtained in the form of a sparingly soluble hydrochloride which, after its decomposition by means of alkali, is filtered with suction and washed. The base crystallizes from chlorobenzene in the form of small rhombohedrons which melt at 258° C.

(4) 30 parts of 2-acetyl-amino-5, 6, 7, 8-tetrahydronaphthalene (Annalen der Chemie, vol. 426, page 59) are stirred with 50 parts of para-chlorobenzoyl chloride in 250 parts by volume of dry carbon disulfide; 200 parts of pulverized aluminium chloride are then added in portions. Stirring is continued for one hour at ordinary temperature; the whole is then heated on the water-bath until the evolution of hydrochloric acid has decreased. The carbon disulfide is then distilled and the residue is decomposed in the usual manner with ice and hydrochloric acid. The resinous acetyl compound thus obtained, which dissolves in concentrated sulfuric acid to a yellow solution, is dried and triturated with xylene in order to remove the chlorobenzoic acid and any impurities, the solid matter is filtered with suction and the filtrate is freed from xylene by steam-distillation.

The solid matter remaining on the filter is saponified by boiling it for 3 to 4 hours with 20 times its weight of a mixture of equal parts of concentrated hydrochloric acid and water, whereby the hydrochloride of the base begins to separate.

The hydrochloride is cooled, filtered with suction and decomposed by means of water with addition of a small quantity of alkali. There is obtained the para-chlorobenzoyl-2-aminotetrahydronaphthalene which crystallizes from alcohol in the form of uniform yellow little rods, melting at 155° C. By means of benzoyl chloride a base is obtained the hydrochloride of which crystallizes from hydrochloric acid (1:1) in the form of colorless needles, melting at 185° C.–187° C.

(5) 25 parts of 1-acetamino-3,4-dimethylbenzene are stirred with 50 parts of benzoic acid anhydride in 200 parts by volume of dry carbon disulfide, and 150 parts of pulverized aluminium chloride are then added in portions, while cooling the reaction vessel with ice-water. The mass is stirred for one hour at room temperature and is then gently heated on the water-bath for 6 hours until the evolution of hydrochloric acid has decreased. The carbon disulfide is then distilled and the residue is decomposed with ice and hydrochloric acid. The whole is filtered with suction, the solid matter is washed first with hydrochloric acid until the aluminium salts have been removed and then with dilute caustic soda solution in order to eliminate the excess of benzoic acid. The remaining solid matter is washed until neutral and crystallized from aqueous methanol. The 2-acetamino-4,5-dimethylbenzophenone thus obtained forms colorless prisms which melt at 117° C. and dissolve in concentrated sulfuric acid to a yellow solution. By saponification in the manner it is converted into the 2-amino-4,5-dimethylbenzophenone which forms coarse yellow crystals melting at 93° C. and is more precisely characterized in Example (1).

We claim:

1. The process which comprises causing a compound of the group consisting of chlorides and anhydrides of aromatic carboxylic acids of the benzene and naphthalene series to act in the presence of aluminium chloride on a compound of the general formula:

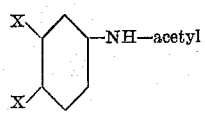

which contains two identical methyl groups in positions X or a tetramethylen chain bound at both ends to the benzene nucleus in positions X.

2. The process which comprises causing an aromatic carboxylic acid chloride of the benzene and naphthalene series to act in the presence of aluminium chloride and an inert diluent on a compound of the general formula:

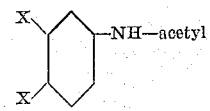

which contains two methyl groups in positions X or a tetramethylen chain bound at both ends to the benzene nucleus in positions X.

3. The process which comprises causing a compound of the group consisting of chlorides and anhydrides of aromatic carboxylic acids of the benzene and naphthalene series to act in the presence of aluminium chloride on a compound of the general formula:

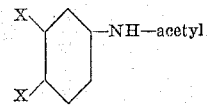

which contains two identical methyl groups in positions X or a tetramethylen chain bound at both ends to the benzene nucleus in positions X and saponifying the NH—acetyl group of the compound thus obtained to the amino group.

4. The process which comprises causing an aromatic carboxylic acid chloride of the benzene and naphthalene series to act in the presence of aluminium chloride and an inert diluent on a compound of the general formula:

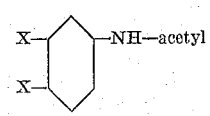

which contains two methyl groups in positions X or a tetramethylen chain bound at both ends to the benzene nucleus in positions X and saponifying the NH—acetyl group of the compound thus obtained to the amino group.

5. The process which comprises causing benzoyl chloride to act in the presence of aluminium chloride and carbon disulfide on 1-acetylamino-3,4-dimethylbenzene and saponifying the NH—acetyl group of the compound thus obtained to the amino group.

6. The process which comprises causing terephthaloyl chloride to act in the presence of aluminium chloride and carbon disulfide on 1-acetylamino-3,4-dimethylbenzene and saponifying the NH—acetyl group of the compound thus obtained to the amino group.

7. The process which comprises causing parachlorobenzoyl chloride to act in the presence of aluminium chloride and carbon disulfide on 2-acetylamino-5,6,7,8-tetrahydronaphthalene and saponifying the NH—acetyl group of the compound thus obtained to the amino group.

8. The compounds of the general formula:

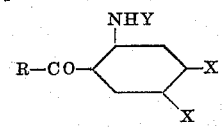

wherein Y represents hydrogen or acetyl, R an aryl group of the benzene and naphthalene series and which compounds contain two identical methyl groups in positions X or a tetramethylen chain bound at both ends to the benzene nucleus in positions X.

9. The compounds of the general formula:

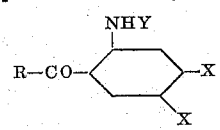

wherein Y represents hydrogen or acetyl, R an aryl group of the benzene and naphthalene series and which compounds contain two methyl groups in positions X or a tetramethylen chain bound at both ends to the benzene nucleus in positions X.

10. The compound of the formula:

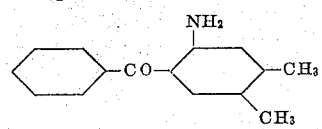

being easily soluble in alcohol, benzene and glacial acetic acid and, to a small extent, in hot water.

11. The compound of the formula:

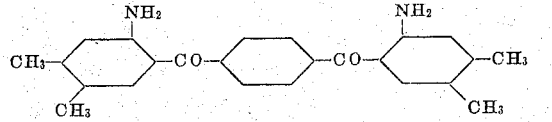

crystallizing from chlorobenzene in the form of small rhombohedrons which melt at 258° C.

12. The compound of the formula:

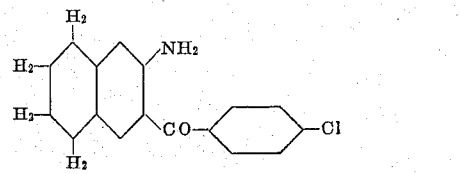

crystallizing from alcohol in the form of yellow little rods melting at 155° C.

GEORG KRÄNZLEIN.
THEODOR MEISSNER.